(12) United States Patent
Derakhshani et al.

(10) Patent No.: US 11,403,383 B2
(45) Date of Patent: *Aug. 2, 2022

(54) PASSIVE AFFECTIVE AND KNOWLEDGE-BASED AUTHENTICATION THROUGH EYE MOVEMENT TRACKING

(71) Applicant: Advanced New Technologies Co., Ltd., Grand Cayman (KY)

(72) Inventors: Reza R. Derakhshani, Shawnee, KS (US); Sashi Kanth Saripalle, Overland Park, KS (US)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/367,149

(22) Filed: Jul. 2, 2021

(65) Prior Publication Data
US 2021/0334351 A1    Oct. 28, 2021

Related U.S. Application Data

(63) Continuation of application No. 16/154,263, filed on Oct. 8, 2018, now Pat. No. 11,055,388.

(51) Int. Cl.
*G06F 21/32*    (2013.01)
*G06F 3/01*    (2006.01)
(Continued)

(52) U.S. Cl.
CPC ............ *G06F 21/32* (2013.01); *G06F 3/013* (2013.01); *G06K 9/6257* (2013.01); *G06V 40/18* (2022.01)

(58) Field of Classification Search
CPC .......... G06F 21/32; G06F 21/36; G06F 3/013; G06K 9/00597; G06K 9/6257; H04L 63/0861; H04L 63/10
See application file for complete search history.

(56) References Cited

U.S. PATENT DOCUMENTS 9,367,677 B1 * 6/2016 Adhami ................. G06F 21/32
2013/0336547 A1 * 12/2013 Komogortsev ........ A61B 5/163
382/117

(Continued)

OTHER PUBLICATIONS

Chiasson et al. "Persuasive Cued Click-Points: Design, implementation, and evaluation of a knowledge-based authentication mechanism," IEEE Transactions on Dependable and Secure Computing, Nov. 2011, 15 pages.

(Continued)

*Primary Examiner* — Khoi V Le
(74) *Attorney, Agent, or Firm* — Fish & Richardson P.C.

(57) ABSTRACT

Methods, systems, and apparatus, including computer programs encoded on a computer storage medium, for authenticating a user based on passive affective and knowledge-based authentication (AKBA). In one aspect, a method includes data associated with eye movements and ocular dynamics of the user are captured with a camera as the user looks at a graphical user interface (GUI) of a device; an AKBA signature of the user is determined based on the captured data; the user is authenticated based on a comparison of the AKBA signature with an AKBA template associated with the user; and an access to a subset of functions of an application is granted.

15 Claims, 5 Drawing Sheets

(51) Int. Cl.
*G06K 9/62* (2022.01)
*G06V 40/18* (2022.01)

(56) References Cited

U.S. PATENT DOCUMENTS

2014/0125574 A1* 5/2014 Scavezze .............. H04W 12/06
                                                    345/156
2017/0300686 A1* 10/2017 Shyu ....................... G06F 21/36

OTHER PUBLICATIONS

PCT International Preliminary Report on Patentability in International Application No. PCT/US2019/055133, dated Apr. 8, 2021, 8 pages.
PCT International Search Report and Written Opinion in International Application No. PCT/US2019/055133, dated Dec. 19, 2019, 14 pages.

* cited by examiner

PASSIVE AFFECTIVE AND KNOWLEDGE-BASED AUTHENTICATION THROUGH EYE MOVEMENT TRACKING

CROSS-REFERENCE TO RELATED APPLICATIONS

This application is a continuation of U.S. patent application Ser. No. 16/154,263, filed on Oct. 8, 2018, which is hereby incorporated by reference in its entirety.

BACKGROUND

The present disclosure relates generally to biometric authentication and, more particularly, to systems and methods for passive affective and knowledge-based authentication (AKBA) through eye movement tracking.

Biometric systems can be used to authenticate the identity of individuals to determine whether to grant or deny access to certain properties or resources. For example, cameras can be used by a biometric security system to identify an individual based on the individual's unique physical properties. Biometric data captured from an individual, such as during an enrollment process, can be stored as a template that is used to verify the identity of the individual at a later time.

SUMMARY

Implementations of the present disclosure are generally directed to passive affective and knowledge-based authentication (AKBA) using biometric signatures. More specifically, implementations are directed to capturing data associated with eye dynamics of the user as the user looks at a graphical user interface (GUI) of a device. An AKBA signature of the user is determined based on the captured data. The AKBA signature is employed to authenticate the users to enable the use of services.

In one implementation, a user is authenticated based on a passive AKBA, the method of authenticating the user is executed by one or more processors and has steps that includes: capturing data associated with eye movements and ocular dynamics of the user with a camera as the user looks at a GUI of a device; determining an AKBA signature of the user based on the captured data; authenticating the user based on a comparison of the AKBA signature with an AKBA template associated with the user; and granting access to a subset of functions of an application.

Particular implementations of the subject matter described in this disclosure can be implemented so as to realize one or more of the following advantages. One can argue that the real identity of a person is in accordance with his or her true memories, likes and dislikes, and other person-specific life experiences and the personality profile that they identify with. Such inner identity does not change with alterations to one's outward appearance, providing a distinct advantage over traditional biometrics relying only on physical characterization of spatially limited patterns such as those found in fingertips or irises. Spoofing inner traits is also much harder or even impossible. However, inferring the aforesaid information is not user-friendly. The knowledge discovery part, also known as KBA, is time-consuming and verbose. The derivation of affective component is even more complicated. In this work, we utilize dynamics of the eye, modulated naturally when the user is presented with preprogrammed visual stimuli with specific affective valence and memory relevance (or lack thereof), for AKBA.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will become apparent from the Detailed Description, the Claims, and the accompanying drawings.

DETAILED DESCRIPTION

Figure 1:
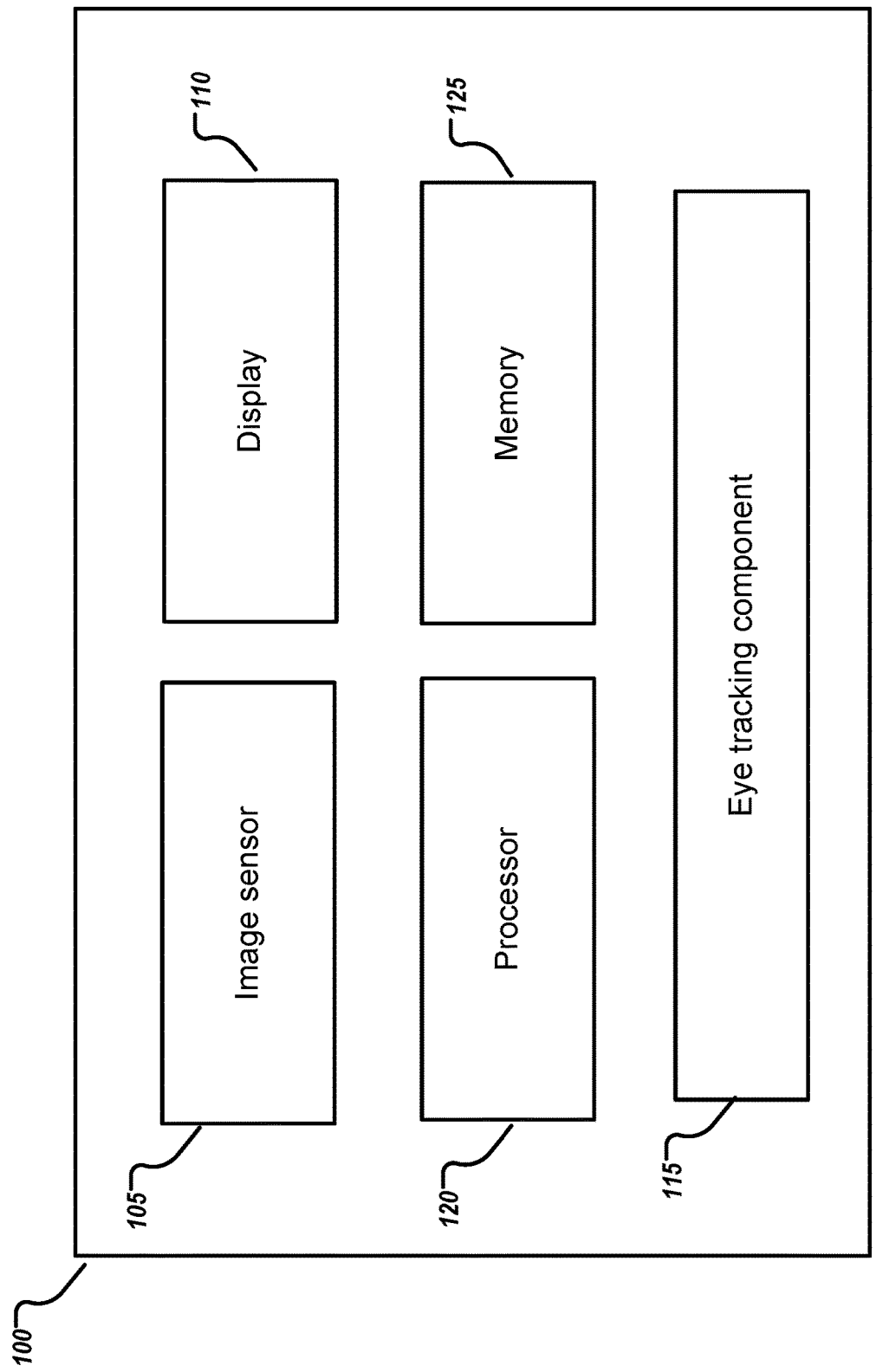
FIG. 1 is a block diagram illustrating an example device for a passive affective and knowledge-based biometric authentication (AKBA) system, according to some implementations of the present disclosure.

Implementations of the present disclosure are generally directed to capturing passive AKBA signature for biometric authentication. More particularly, implementations of the present disclosure are directed to a biometric authentication system deployed within a device (such as a mobile device, a kiosk, etc.) that employs one or more cameras to capture information containing eye movements and other ocular dynamics of a user. The information can be used by the biometric authentication system to authenticate users. The device provides access to services based on the authentication.

Authentication allows users to confirm his or her identity to, for example, a Web application. Various biometric identification/authentication systems are based on capturing one or more images, which are then compared with or analyzed with reference to template images captured during an enrollment process. For example, a biometric authentication system using facial identification may require enrolling users to pose for one or more images of their face during an enrollment process. The images captured during the enrollment process, or more commonly, the unique features derived from them, are called an enrollment template and may be stored on a storage device accessible to the biometric authentication system. During run-time, a facial image of a user can be captured and compared with one or more face templates to determine if the user may be authenticated.

Affective and knowledge-based authentication is based on knowledge and/or affective profile the individual has. To verify a user, a KBA system can ask the user a series of questions, either based on information within the data source the user is using (i.e., a dynamic KBA) or based on information collected from a user (i.e., a static KBA). Interface to a KBA system can be text-based (e.g., answer to the question "what is your mother's maiden name?"), or graphic-based (e.g., asking a user to pick an image that represents his hometown from a set of images). The present disclosure describes a passive AKBA system that established the identity of a user through tracking the eye movements and other ocular dynamics of the user when the user is presented with various preprogrammed visual stimuli. That is, instead of asking the user questions and authenticating the user based on their direct answers to those questions, the disclosed AKBA system authenticates users by measuring various distinguishing features of eye movements and dynamics of the users, and the features are measured when users are looking at different preprogrammed and person-specific affective-cognitive visual stimuli. One can argue that the real identity of a person is in accordance to his or her true memories, likes and dislikes, and other person-specific life experiences and personality profile that they identify with. Such inner identity does not change with alterations to one's outward appearance, providing a distinct advantage for AKBA over traditional biometrics relying only on physical characterization of spatially limited patterns such as those found in fingertips or irises. Spoofing inner traits are also much harder or even impossible. However, inferring the aforesaid information is not user-friendly. The knowledge discovery part, as utilized by traditional KBA, is time-consuming and verbose. The derivation of affective component is even more complicated. Here, we present utilization of ocular dynamics modulated naturally when the user is presented with preprogrammed visual stimuli with specific affective valence and memory relevance (or lack thereof), for AKBA for a more user-friendly and more secure AKBA system.

Features of eye movement can be measured through various techniques. Eye tracking refers to the process of identifying the gaze or movement of an eye. Distinctive features of an individual's gazing behavior in response to preprogrammed visual stimuli with certain relevance (or lack thereof) to the user may be used to identify or authenticate the individual. For example, images of a user's eye can be obtained and analyzed to compare features of the eye to reference records to authenticate the user and grant or deny the user access to a resource. Techniques used in this disclosure are based on the theories that human eyes respond to different environmental triggers in different ways. Such different environmental triggers can be verbal, imagery, etc. Different responses corresponding to these environmental triggers can be observed and quantified by features such as pupil dilation, gazing fixation, blink rate, etc.

The pupillary response is a physiological response that can have a variety of causes, from an involuntary reflex reaction to exposure or inexposure to light. Pupils dilate and constrict in response to both environmental changes (e.g., ambient light), and changes in mental states. For example, a larger pupil allows the eye to welcome a larger volume of light and attain higher clarity in the absence of suitable illumination. On the other hand, the pupil becomes smaller when subject to a glut of light, as excess exposure would have deleterious effects on the eye's lens and retina. In addition, pupil size is also sensitive to mental activity. Pupil size increases in proportion to the difficulty of a task at hand. For example, people solving difficult math problems can demonstrate a slightly more enlarged pupil than those whose are tested with easier problems. The mental effort entailed by accessing memory and maintaining attention is positively correlated with pupil size—more work means a larger pupil.

Gazing behavior is also a fundamental human behavior with important cognitive, affective, motivational, and social underpinnings that are likely to produce individual differences linking it to major personality traits. Eye movements that people make during free viewing can be associated with the properties of an image. A series of related gaze points (e.g., points show what the eyes are looking at) can form a fixation, denoting a period where the eyes are locked towards an object. The amount of fixation or gaze points that are directed towards a certain part of an image (relative to other parts) shows that more visual attention has been directed there. Order of attention can be used in eye tracking since it reflects a person's interest.

Blinking is a semi-autonomic rapid closing of the eyelid. There are a number of factors that can alter the blink rate and have a profound impact on the ocular surface. Blink rates may change depending on the activity being completed. The blink rate increases when engaged in conversation, and decreases when focusing on a specific visual task. Blink rates are also highly influenced by internal factors such as fatigue, stress medications, emotions, and surface conditions of the object. Blink rates may be altered by cognitive and emotional function. For example, people who experience emotional excitement, anxiety, or frustration have an increased blink rate; feelings of guilt have also been reported to affect normal blink patterns.

In an example context, an AKBA system may be deployed in a device, such as an automated teller machine (ATM), or a mobile device. The device may include one or more cameras that can be used by the AKBA system to capture run-time images of the user's eyes, along with an interactive display for preprogrammed visual stimuli. The information contained in these ocular videos can be analyzed to generate a signature or template for each user. The AKBA signature may include pupil dilation, gazing fixation, blinking rate, and so forth. The AKBA signature can be employed alone or in combination with other biometric data, such as described above, in biometric authentication.

In some implementations, a baseline or template can be captured during an enrollment process. In some implementations, the AKBA system may first ask the user a series of initial (visual) questions to determine the positive and negative preferences of the user. For example, questions like "what is your most favorite car?" or "what is your least favorite food?" Then the AKBA system requires the enrolling users to look at the GUI of the device while a set of images are displayed on the GUI. The displayed set of images include images representing the user's positive and negative preferences according to their answers to the initial questions (for example, designating images containing car A as positive preference images and images containing food B as negative reference images). The AKBA GUI may also gauge true memories vs. irrelevant recalls (e.g. which one is the image of your house?). A camera embedded on the device captures data associated with eye movements (and other additional features such as pupil dilation) of the users while the users look at these images. The AKBA system collects the user's eye movement data associated with positive and negative reference images as well as relevant/irrelevant memories, and creates templates (that can be positive templates or negative templates) based on the data, respectively. In some implementations, the templates created during the enrollment process may be stored on a storage device accessible to the biometric authentication system. During run-time, a sample AKBA signature of a user can be captured and compared with the AKBA templates to determine if the user may be authenticated. In some implementations, a similarity score may be generated based on the comparison of the sample AKBA signature and baseline AKBA templates.

FIG. 1 is a block diagram illustrating an example device 100 for a passive AKBA system, according to some implementations of the present disclosure. The device 100 includes one or more components that support a biometric authentication system. For example, the device 100 can include an image sensor 105, a display 110, an eye tracking component 115, a processor 120, a memory 125, and a system bus that couples various system components, including the memory 125 to the processor 120.

The device 100 can include, for example, a kiosk, a wearable device, and/or a mobile device. Examples of device 100 can include, but are not limited to, a smart phone, a smart watch, smart glasses, tablet computer, laptop, gaming device, palmtop portable computer, television, personal digital assistant, wireless device, workstation, or other computing devices that are operated as a general purpose computer or a special purpose hardware device that can execute the functionality described herein. The device 100 may be used for various purposes that require authenticating users via one or more biometric authentication processes. For example, the device 100 can be an ATM kiosk that allows a user to withdraw money from a bank account. In another example, the device 100 can be a mobile phone that allows a user to view or transfer money through an online banking application.

The image sensor 105 can be employed to capture images of eyes of, for example, the user who is interacting with the device 100. The image sensor 105 can be a camera that is associated with the device 100, or a camera that is existing independently of a device. By way of illustration, the camera can be a digital camera, a three-dimensional (3D) camera, or a light field sensor. In some implementations, the camera can be an inward facing module in a wearable device with a spectacle form factor, and used to capture images of the eye. In some implementations, multiple cameras at various locations on a device can be used together to capture the different images of both eyes. The image can be captured either in still mode or in video mode. In some implementations, the camera has near-infrared sensitivity and illumination to better capture pupils of dark irises.

The display 110 may display information to a user. The display may also be used by the user to interact with the device 100. For example, the display may be a touch screen type of device displaying a user interface (UI) through which the user can enter and receive data.

Eye tracking component 115 can include hardware and/or software modules that perform operations on images captured by image sensor 105. For example, eye tracking component 115 can process and analyze eye images to identify interest points, extract features around the interest points, create templates based on the features, and determine eye movement based on the templates over time.

In some implementations, the eye tracking component 115 may include a communication interface (not shown). The communication interface can be employed to provide digital signals to the biometric authentication system deployed to the device 100. In some implementations, the communication interface may include communication via a Universal Serial Bus (USB), Bluetooth, Ethernet, wireless Ethernet, and so forth. In some implementations, through the eye tracking component 115, the captured measurement data may be employed in conjunction with the image sensor 105 by the respective biometric authentication system deployed to the device 100.

In some implementations, the image captured using the eye tracking component 115 along with the determined AKBA signature can be processed by the biometric authentication system to identify/authenticate the user. In some implementations, the biometric authentication system may extract from the images, various features, such as features associated with the pupil, iris, vasculature on or underlying the sclera of the eye (e.g. conjunctival and episcleral), and so forth, to identify/authenticate a particular user based on matching the extracted features to that of one or more template images and AKBA signatures generated and stored for the user during an enrollment process. In some implementations, the biometric authentication system may use a machine-learning process (e.g., a deep learning process implemented using a deep neural network architecture) to match the user to his or her stored templates. In some implementations, the machine-learning process may be implemented, at least in part, using one or more processing devices deployed on the device 100. In some implementations, the device 100 may communicate with one or more remote processing devices (e.g., one or more servers) that implement the machine learning process (see FIG. 2).

Figure 2:
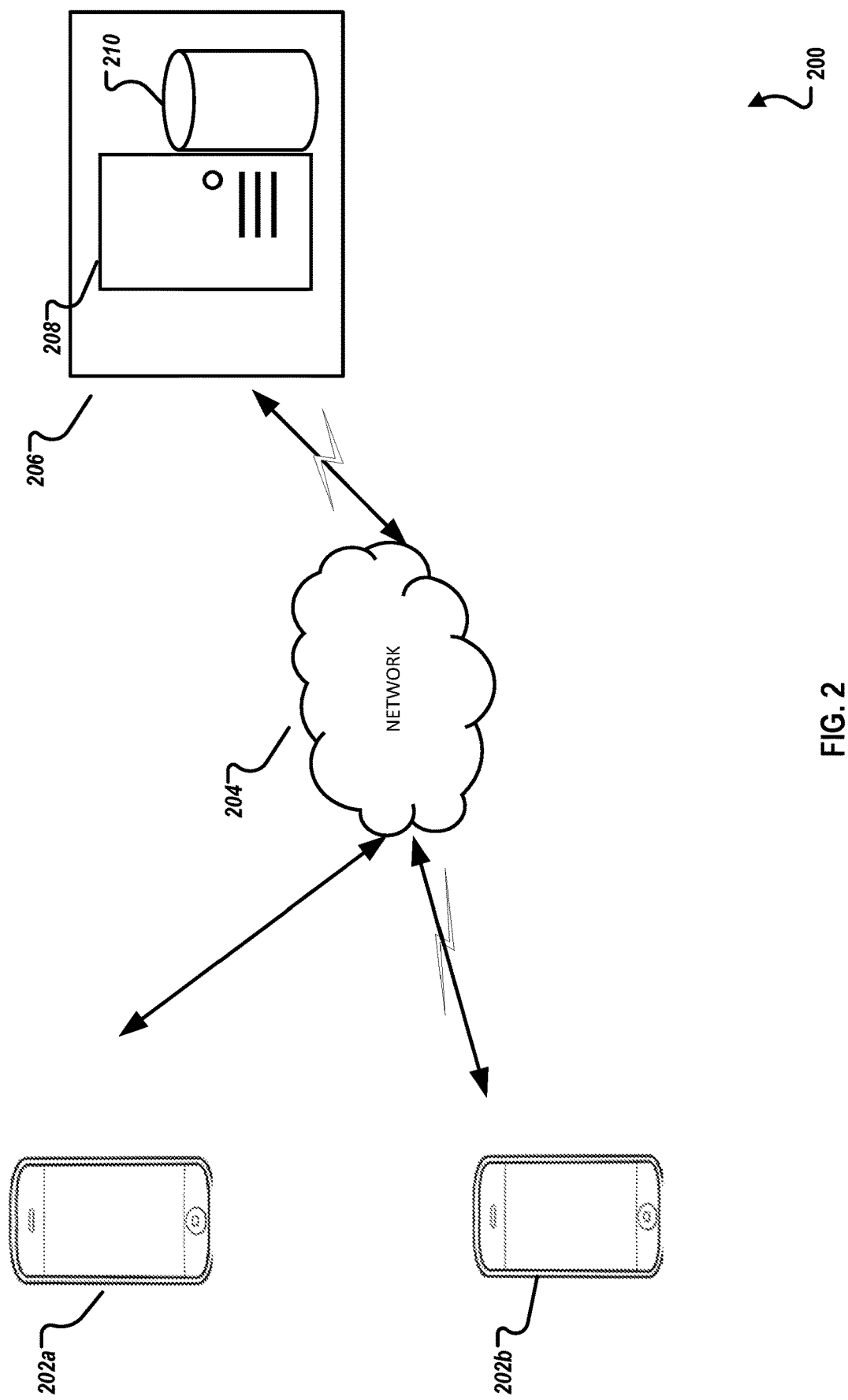
FIG. 2 is an example environment for executing a passive AKBA system, according to some implementations of the present disclosure.

FIG. 2 is an example environment 200 for executing a passive AKBA system, according to some implementations of the present disclosure. The example environment 200 includes network 204, a back-end system 206, and devices 202 (for example, 202*a* and 202*b*, herein as "devices 202"). The devices 202 are substantially similar to the device 100 of FIG. 1.

In some implementations, the network 204 includes a local area network (LAN), wide area network (WAN), the Internet, or a combination thereof, and connects computing devices (e.g., devices 202) and back-end systems (e.g., the back-end system 206). In some implementations, the network 204 can be accessed over a wired and/or a wireless communications link.

In the depicted example, the back-end system 206 includes at least one server system 208 and a data store 210. In some implementations, the back-end system 206 provides access to one or more computer-implemented services with which the devices 202 may interact. The computer-implemented services may be hosted on, for example, the at least one server system 208 and the data store 210. The computer-implemented services may include, for example, an authentication service that may be used by the devices 202 to authenticate a user based on collected AKBA signatures and/or image data.

In some implementations, the back-end system 206 includes computer systems employing clustered computers and components to act as a single pool of seamless resources when accessed through the network 204. For example, such implementations may be used in a data center, cloud computing, storage area network (SAN), and network attached storage (NAS) applications. In some implementations, the back-end system 206 is deployed and provides computer-implemented services through a virtual machine(s).

Figure 3:
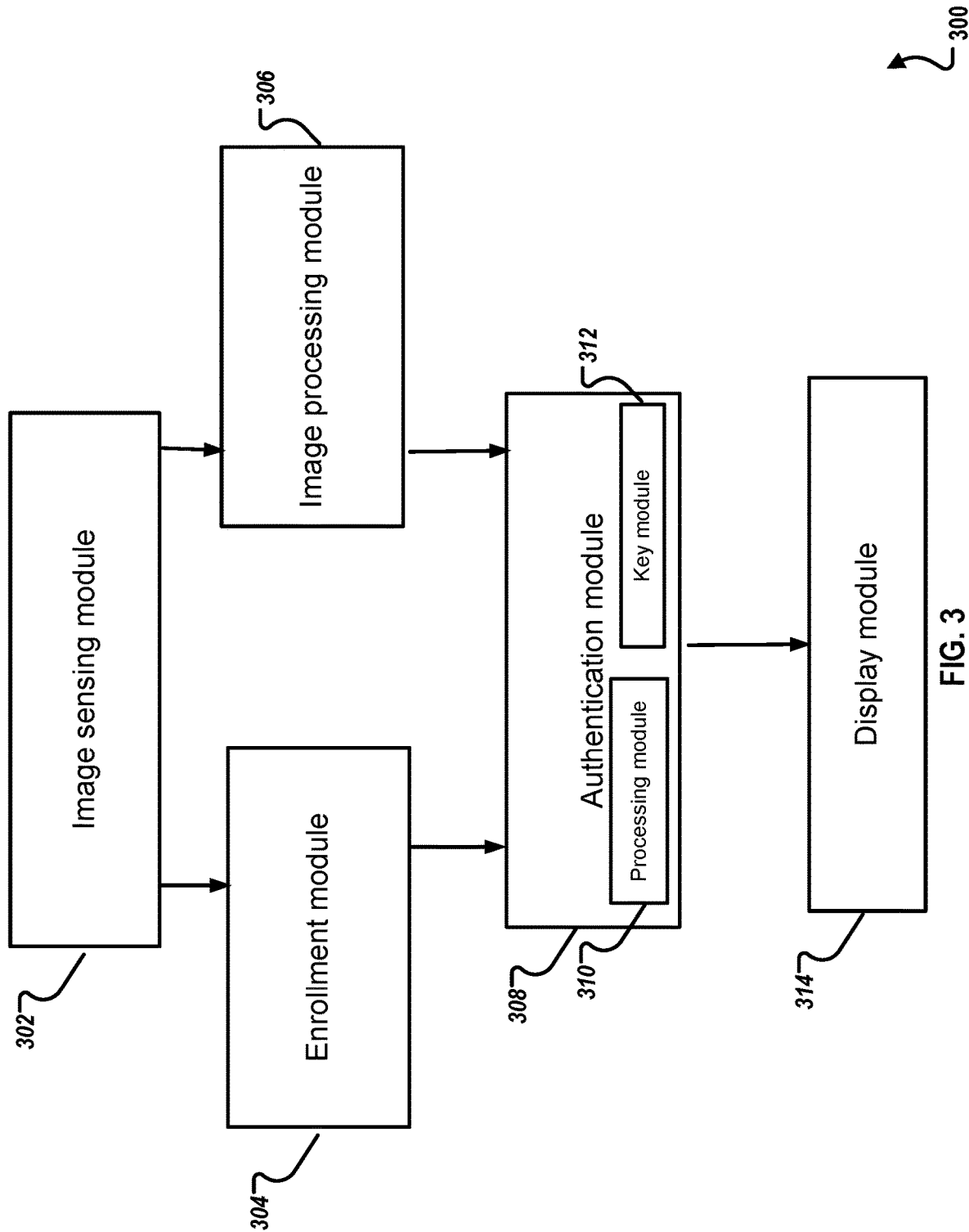
FIG. 3 is an example system for executing a passive AKBA, according to some implementations of the present disclosure.

FIG. 3 is an example system 300 for executing a passive AKBA, according to some implementations of the present disclosure. The system 300 includes image sensing module 302, an enrollment module 304, an image processing module 306, an authentication module 308, and a display module 314. In some implementations, the system 300 may be included within a device, such as described with reference to FIG. 1. For example, the display module 314 can be the display 110 in FIG. 1 and the image sensing module 302 can be a component of the image sensor 105 of FIG. 1. In some implementations, the display module 314 can be disposed on a mobile device, such as a smartphone, tablet computer, or an e-reader.

Outputs from the image sensing module 302 can be used as the inputs to the enrollment module 304 and the image processing module 306. In some implementations, one or more eye images are captured with an image sensor at an image quality suitable for the image processing functionality described herein, such as 720p, 1080p, or equivalent/higher resolution in visible and/or near IR. The image sensor can be a one megapixel or a better image sensor such as the front-facing camera generally found in cellular phones and tablets or dedicated cameras. Upon detection of a stable gaze and at least one eye of the user, a stack of images of the user's eye(s) are captured. The enrollment module 304 creates biometric templates based on the images and performs various operations to increase template security while maintaining usability. Image processing module 306 can perform segmentation and enhancement on images of the eye of a user to assist in isolating various features such as eyeball and face pose, as well as pupil diameter.

The authentication module 308 validates the identity of a user, through one or more processing modules 310, by performing matching operations between the biometric AKBA signatures formed upon capturing ocular AKBA reading and a previously stored enrollment template. At the time of verification, the stored AKBA enrollment template for the claimed identity is matched against the presented AKBA verification template. In some implementations, only a subset of the enrollment AKBA template may be used during verification. In one implementation, if the similarity score is within a range of a preset threshold, which also entails pairing of a certain minimum number of elements across enrollment and verification templates, then the claimant is accepted, and a match decision is issued. In some implementations, the length and complexity of verification process depend on the score attained during initial stages of AKBA verification (i.e. if the first series of AKBA responses do not achieve a high level of confidence, the tests continue in order to accrue additional affective-cognitive evidence of identity). Note that the eye images can be immediately discarded after the creation of the template, and only the enrollment templates stored. Key module 312 can encode a secret key for the user based on an AKBA biometric enrollment template and decode the key upon successful verification of the user's identity using a signature, since the derived responses provide specific knowledge that can be hashed into a private key.

In some implementations, the output of the authentication module 308 may be used to drive a display module 314. The enrollment module 304, the image processing module 306, the authentication module 308, the processing module 310, and the key module 312 can be stored in a memory and executed on a processor. By way of illustration, the program modules can be in the form of one or more suitable programming languages, which are converted to machine language or object code to allow the processor or processors to execute the instructions. The software can be in the form of a standalone application, or implemented in a suitable programming language or framework.

Figure 4:
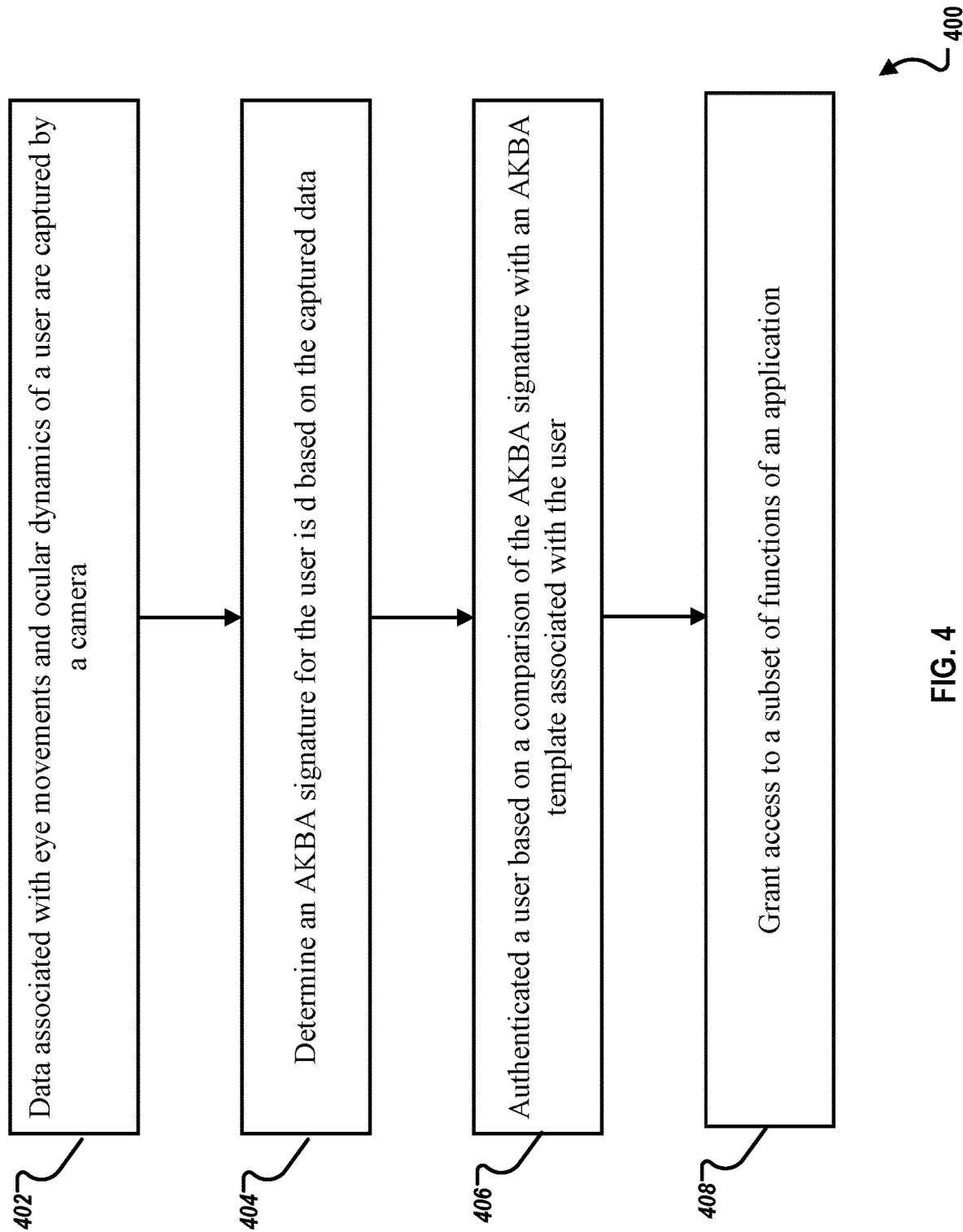
FIG. 4 is a flowchart illustrating an example method for executing a passive AKBA, according to some implementations of the present disclosure.

FIG. 4 is a flowchart illustrating an example method 400 for executing a passive AKBA, according to some implementations of the present disclosure. At 402, as a user looks at a graphical user interface (GUI) of a device, and data associated with eye movements of the user are captured by a camera. In some implementations, the user looks at a GUI of a device while a set of images are displayed on the GUI of the device. From 402, the method 400 proceeds to 404.

At 404, an AKBA signature for the user is determined based on the captured data. In some implementations, an AKBA signature includes a plurality of measurements of features that are associated with eye movements, and the features comprise a pupil size, a gazing fixation and transition dynamic, and a blinking rate of at least one eye of the user. From 404, the method 400 proceeds to 406.

At 406, the user is authenticated based on a comparison of the AKBA signature with an AKBA template associated with the user. In some implementations, the AKBA template also includes a plurality of measurements of features that are associated with eye movements, and the features comprise at least one of a pupil size, a fixation, gaze transition dynamics in response to AKBA GUI, or a blinking rate of at least one eye of the user.

In some implementations, the AKBA template of the user is generated during an enrollment process. In some implementations, the method of generating an AKBA template of a user during an enrollment process includes determining, a plurality of positive and negative preferences of a user or genuine biographical/life experience knowledge; displaying, a set of preprogrammed visual stimulus to the user on a GUI of a device, wherein the set of preprogrammed visual stimulus comprise visual stimulus corresponding to the determined positive and negative preferences of the user or true vs false memories; capturing, with a camera, data associated with eye movements of the user as the user looks at the set of preprogrammed visual stimulus; and generating, an AKBA template based on the captured data.

In some implementations, the method of authenticating the user includes performing: generating a similarity score based on a comparison of the AKBA signature to the AKBA template, and authenticating the user based on the similarity score, wherein the user is authenticated when the similarity score is within a range of a predetermined threshold.

In some implementations, the method of generating a similarity score includes: determining a plurality of first scores, wherein each first score is determined based on a comparison of a measurement of a feature comprised in the AKBA template and a measurement of the same feature comprised in the AKBA signature; determining a respective weight for each of the first scores, and combining the first scores weighted by their respective weights to determine the similarity score. From 406, the method 400 proceeds to 408.

At 408, a subset of functions of an application is granted. After 408, the method 400 ends.

Figure 5:
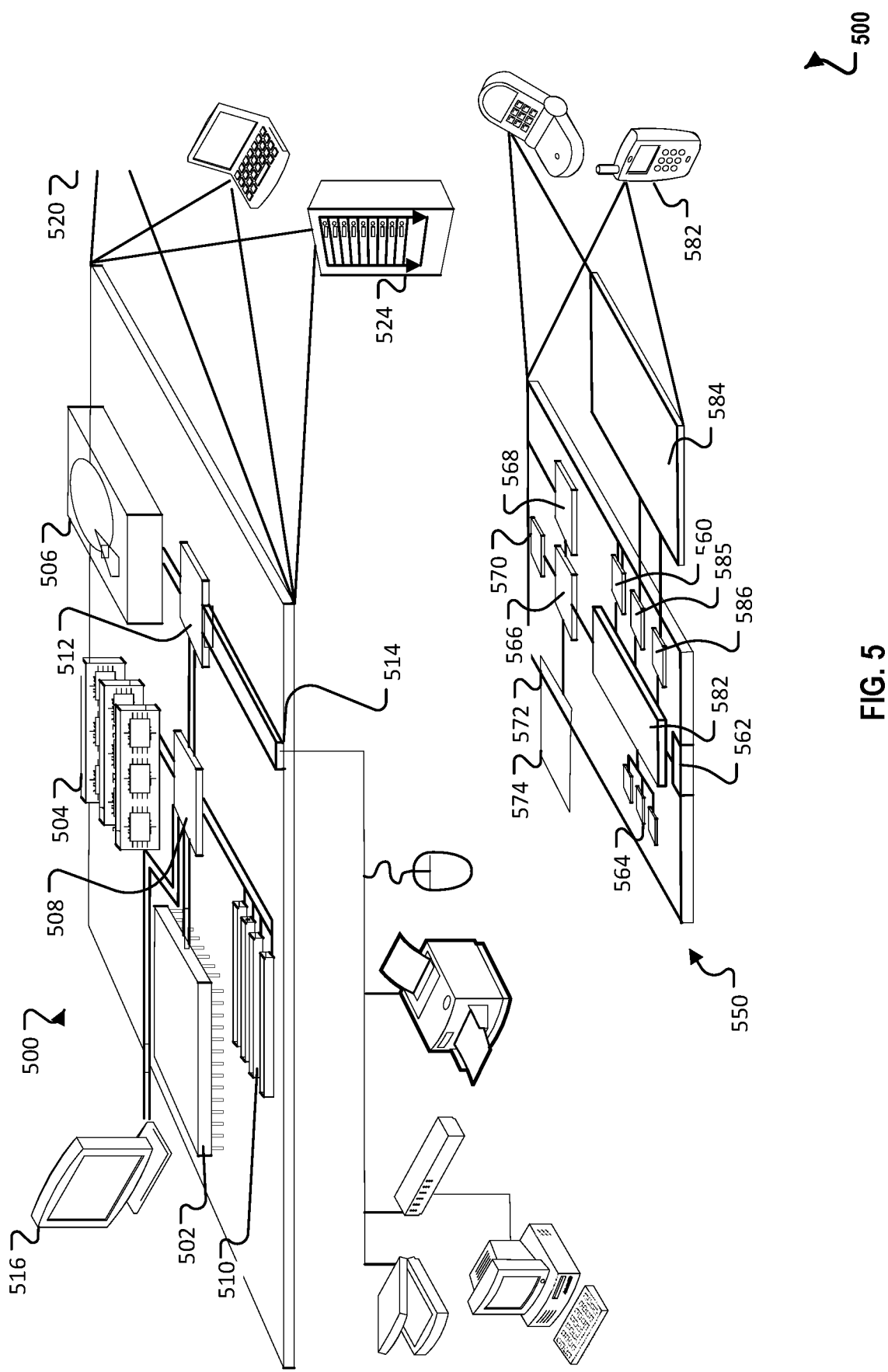
FIG. 5 is an example of a computing device and a mobile computing device that are employed to execute implementations of the present disclosure, according to some implementations of the present disclosure.

FIG. 5 is an example of a computing device 500 and a mobile computing device 550 that are employed to execute implementations of the present disclosure, according to some implementations of the present disclosure. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting.

The computing device 500 includes a processor 502, a memory 504, a storage device 506, a high-speed interface 508, and a low-speed interface 512. In some implementations, the high-speed interface 508 connects to the memory 504 and multiple high-speed expansion ports 510. In some implementations, the low-speed interface 512 connects to a low-speed expansion port 514 and the storage device 506. Each of the processor 502, the memory 504, the storage device 506, the high-speed interface 508, the high-speed expansion ports 510, and the low-speed interface 512, are interconnected using various buses, and may be mounted on a common motherboard or in other manners as appropriate. The processor 502 can process instructions for execution within the computing device 500, including instructions stored in the memory 504 and/or on the storage device 506 to display graphical information for a graphical user interface (GUI) on an external input/output device, such as a display 516 coupled to the high-speed interface 508. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of a computer-readable medium, such as a magnetic or optical disk.

The storage device 506 is capable of providing mass storage for the computing device 500. In some implementations, the storage device 506 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 502, perform one or more methods, such as those described above. The instructions can also be stored by one or more storage devices, such as computer-readable or machine-readable mediums, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards. In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices. Such input/output devices may include a scanner 530, a printing device 534, or a keyboard or mouse 536. The input/output devices may also be coupled to the low-speed expansion port 514 through a network adapter. Such network input/output devices may include, for example, a switch or router 532.

The computing device 500 may be implemented in a number of different forms, as shown in the FIG. 5. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device, such as a mobile computing device 550. Each of such devices may contain one or more of the computing device 500 and the mobile computing device 550, and an entire system may be made up of multiple computing devices communicating with each other.

The mobile computing device 550 includes a processor 552; a memory 564; an input/output device, such as a display 554; a communication interface 566; and a transceiver 568; among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate. In some implementations, the mobile computing device 550 may include a camera device(s) (not shown).

The processor 552 can execute instructions within the mobile computing device 550, including instructions stored in the memory 564. The processor 552 may be implemented as a chipset of chips that include separate and multiple analog and digital processors. For example, the processor 552 may be a Complex Instruction Set Computers (CISC) processor, a Reduced Instruction Set Computer (RISC) processor, or a Minimal Instruction Set Computer (MISC) processor. The processor 552 may provide, for example, for coordination of the other components of the mobile computing device 550, such as control of user interfaces (UIs), applications run by the mobile computing device 550, and/or wireless communication by the mobile computing device 550.

The processor 552 may communicate with a user through a control interface 558 and a display interface 556 coupled to the display 554. The display 554 may be, for example, a Thin-Film-Transistor Liquid Crystal Display (TFT) display, an Organic Light Emitting Diode (OLED) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a Single in Line Memory Module (SIMM) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 552, perform one or more methods, such as those described above. The instructions can also be stored by one or more storage devices, such as one or more computer-readable or machine-readable mediums, such as the memory 564, the expansion memory 574, or memory on the processor 552. In some implementations, the instructions can be received in a propagated signal, such as, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 568 using a radio frequency. In addition, short-range communication, such as using a Bluetooth or Wi-Fi, may occur. In addition, a Global Positioning System (GPS) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in FIG. 5. For example, it may be implemented the device 100 described in FIG. 1. Other implementations may include a mobile device 582 and a tablet device 584. The mobile computing device 550 may also be implemented as a component of a smartphone, personal digital assistant, AR device, or other similar mobile device.

Computing device 500 and/or 550 can also include USB flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be for a special or general purpose, coupled to receive data and instructions from, and to transmit data and instructions to, a storage system, at least one input device, and at least one output device.

These computer programs (also known as programs, software, software applications, or code) include machine instructions for a programmable processor, and can be implemented in a high-level procedural, object-oriented, assembly, and/or machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a GUI or a web browser through which a user can interact with an implementation of the systems and techniques described here), or any combination of such back end, middleware, or front end components. The components of the system can be interconnected by any form or medium of digital data communication. Examples of communication networks include a LAN, a WAN, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method for authenticating a user based on passive affective and knowledge-based authentication (AKBA), the method being executed by one or more hardware processors and comprising:
   capturing, with a camera, data associated with eye movements and ocular dynamics of the user as the user looks at a graphical user interface (GUI) of a device, wherein a stimulus displayed on the GUI comprises at least one first image relating to at least one of positive preferences, negative preferences, or biographical experiences of the user;
   determining an AKBA signature of the user based on the captured data;
   authenticating the user based on a comparison of the AKBA signature with an AKBA template associated with the user, wherein the AKBA template is pregenerated based on the user's eye movements and ocular dynamics in response to a preprogrammed visual stimulus comprising at least one second image relating to at least one of the positive preferences, the negative preferences, or the biographical experiences;
   authenticating the user further comprises:
      generating a similarity score based on the comparison of the AKBA signature with the AKBA template, and authenticating the user based on the similarity score, wherein the user is authenticated when the similarity score is within a range of a predetermined threshold; and
   granting access to a subset of functions of an application in response to authenticating the user based on the comparison of the AKBA signature with the AKBA template.

2. The computer-implemented method of claim 1, wherein the stimulus displayed on the GUI is configured to gauge true memories of the user.

3. The computer-implemented method of claim 1, wherein generating the similarity score comprises:
   determining a plurality of first scores, wherein each first score is determined based on a comparison of a measurement of a respective feature comprised in the AKBA template and a measurement of a corresponding same feature comprised in the AKBA signature;
   determining a respective weight for each of the first scores; and
   combining the first scores weighted by their respective weights to determine the similarity score.

4. The computer-implemented method of claim 1, wherein the AKBA template of the user is pregenerated during an enrollment process.

5. The computer-implemented method of claim 4, comprising pregenerating the AKBA template of the user during the enrollment process, wherein pregenerating the AKBA template comprises:
   querying the user about at least one of the positive preferences, negative preferences, or biographical experiences;
   displaying the preprogrammed visual stimulus comprising the at least one second image; and
   capturing, with a second camera or with the camera, template data associated with eye movements and ocular dynamics of the user as the user looks at the preprogrammed visual stimulus.

6. A non-transitory, computer-readable medium storing one or more instructions executable by a computer system to perform operations for authenticating a user based on passive affective and knowledge-based authentication (AKBA) comprising:
   capturing, with a camera, data associated with eye movements and ocular dynamics of the user as the user looks at a graphical user interface (GUI) of a device, wherein a stimulus displayed on the GUI comprises at least one first image relating to at least one of positive preferences, negative preferences, or biographical experiences of the user;
   determining an AKBA signature of the user based on the captured data;
   authenticating the user based on a comparison of the AKBA signature with an AKBA template associated with the user, wherein the AKBA template is pregenerated based on the user's eye movements and ocular dynamics in response to a preprogrammed visual stimulus comprising at least one second image relating to at least one of the positive preferences, the negative preferences, or the biographical experiences;
   authenticating the user further comprises:
      generating a similarity score based on the comparison of the AKBA signature with the AKBA template, and authenticating the user based on the similarity score, wherein the user is authenticated when the similarity score is within a range of a predetermined threshold; and
   granting access to a subset of functions of an application in response to authenticating the user based on the comparison of the AKBA signature with the AKBA template.

7. The non-transitory, computer-readable medium of claim 6, wherein the stimulus displayed on the GUI is configured to gauge true memories of the user.

8. The non-transitory, computer-readable medium of claim 6, wherein generating the similarity score comprises:
   determining a plurality of first scores, wherein each first score is determined based on a comparison of a measurement of a respective feature comprised in the AKBA template and a measurement of a corresponding same feature comprised in the AKBA signature;
   determining a respective weight for each of the first scores; and
   combining the first scores weighted by their respective weights to determine the similarity score.

9. The non-transitory, computer-readable medium of claim 6, wherein the AKBA template of the user is pregenerated during an enrollment process.

10. The non-transitory, computer-readable medium of claim 9, wherein the operations comprise pregenerating the AKBA template of the user during the enrollment process, and wherein pregenerating the AKBA comprises:
   querying the user about at least one of the positive preferences, negative preferences, or biographical experiences;
   displaying the preprogrammed visual stimulus comprising the at least one second image; and
   capturing, with a second camera or with the camera, template data associated with eye movements and ocular dynamics of the user as the user looks at the preprogrammed visual stimulus.

11. A computer-implemented system, comprising:
   one or more hardware processors; and
   one or more computer-readable storage media coupled to the one or more processors and having instructions stored thereon which, when executed by the one or more processors, cause the one or more processors to perform Operations for authenticating a user based on passive affective and knowledge-based authentication (AKBA) comprising:
- capturing, with a camera, data associated with eye movements and ocular dynamics of the user as the user looks at a graphical user interface (GUI) of a device, wherein a stimulus displayed on the GUI comprises at least one first image relating to at least one of positive preferences, negative preferences, or biographical experiences of the user;
- determining an AKBA signature of the user based on the captured data;
- authenticating the user based on a comparison of the AKBA signature with an AKBA template associated with the user, wherein the AKBA template is pre-generated based on the user's eye movements and ocular dynamics in response to a preprogrammed visual stimulus comprising at least one second image relating to at least one of the positive preferences, the negative preferences, or the biographical experiences;
- authenticating the user further comprises:
  - generating a similarity score based on the comparison of the AKBA signature with the AKBA template, and
  - authenticating the user based on the similarity score, wherein the user is authenticated when the similarity score is within a range of a predetermined threshold; and
- granting access to a subset of functions of an application in response to authenticating the user based on the comparison of the AKBA signature with the AKBA template.

12. The computer-implemented system of claim 11, wherein the stimulus displayed on the GUI is configured to gauge true memories of the user.

13. The computer-implemented system of claim 11, wherein generating the similarity score comprises:
- determining a plurality of first scores, wherein each first score is determined based on a comparison of a measurement of a respective feature comprised in the AKBA template and a measurement of a corresponding same feature comprised in the AKBA signature;
- determining a respective weight for each of the first scores; and
- combining the first scores weighted by their respective weights to determine the similarity score.

14. The computer-implemented system of claim 11, wherein the AKBA template of the user is pregenerated during an enrollment process.

15. The computer-implemented system of claim 14, wherein the operations comprise pregenerating the AKBA template of the user during the enrollment process, and wherein pregenerating the AKBA comprises:
- querying the user about at least one of the positive preferences, negative preferences, or biographical experiences;
- displaying the preprogrammed visual stimulus comprising the at least one second image; and
- capturing, with a second camera or with the camera, template data associated with eye movements and ocular dynamics of the user as the user looks at the preprogrammed visual stimulus.

* * * * *